United States Patent
Fukushima

(10) Patent No.: US 10,476,280 B2
(45) Date of Patent: Nov. 12, 2019

(54) ENERGY STORAGE MANAGEMENT DEVICE DECIDING CHARGE VOLTAGE BASED ON DIFFERENCE IN CHARGE AMOUNT OR VOLTAGE DIFFERENCE BETWEEN ENERGY STORAGE DEVICES

(71) Applicant: GS Yuasa International Ltd., Kyoto-shi (JP)

(72) Inventor: Atsushi Fukushima, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 122 days.

(21) Appl. No.: 15/466,790

(22) Filed: Mar. 22, 2017

(65) Prior Publication Data
US 2017/0288425 A1    Oct. 5, 2017

(30) Foreign Application Priority Data
Mar. 31, 2016    (JP) .................. 2016-071469

(51) Int. Cl.
| H02J 7/00 | (2006.01) |
| H01M 2/10 | (2006.01) |
| H01M 4/58 | (2010.01) |
| H01M 10/0525 | (2010.01) |
| H01M 10/42 | (2006.01) |
| H01M 10/44 | (2006.01) |
| H02J 7/34 | (2006.01) |

(52) U.S. Cl.
CPC .......... *H02J 7/0021* (2013.01); *H01M 2/1077* (2013.01); *H01M 4/5825* (2013.01); *H01M 10/0525* (2013.01); *H01M 10/425* (2013.01); *H01M 10/441* (2013.01); *H02J 7/007* (2013.01); *H02J 7/0016* (2013.01); *H01M 2010/4271* (2013.01); *H01M 2220/20* (2013.01); *H02J 7/345* (2013.01); *Y02E 60/122* (2013.01)

(58) Field of Classification Search
CPC ........ H02J 7/0021; H02J 7/007; H02J 7/0016; H02J 7/345; H01M 10/441; H01M 4/5825; H01M 10/0525; H01M 2/1077; H01M 10/425; H01M 2220/20; H01M 2010/4271; Y02E 60/122
See application file for complete search history.

(56) References Cited

U.S. PATENT DOCUMENTS

| 2003/0232237 A1 | 12/2003 | Nakagawa et al. |
| 2007/0229034 A1 | 10/2007 | Tatebayashi et al. |
| 2009/0039830 A1 | 2/2009 | Pellenc |

(Continued)

FOREIGN PATENT DOCUMENTS

| JP | H 08-140278 A | 5/1996 |
| JP | H 09-200969 A | 7/1997 |

(Continued)

*Primary Examiner* — Drew A Dunn
*Assistant Examiner* — Sailesh Thapa
(74) *Attorney, Agent, or Firm* — McGinn I. P. Law Group, PLLC.

(57) ABSTRACT

Provided is an energy storage device management device which includes a controller configured to decide a charge voltage to be applied to a plurality of energy storage devices connected in series, wherein the controller is configured to perform deciding the charge voltage based on a difference in charge amount or a voltage difference between the energy storage devices.

19 Claims, 16 Drawing Sheets

(56) References Cited

U.S. PATENT DOCUMENTS

| | | | | |
|---|---|---|---|---|
| 2011/0011653 A1* | 1/2011 | Mizutani | ............ | B60L 11/1864 |
| | | | | 180/65.1 |
| 2012/0217931 A1* | 8/2012 | Morina | ................ | H02J 7/0013 |
| | | | | 320/116 |
| 2013/0020997 A1 | 1/2013 | Iwasawa et al. | | |

FOREIGN PATENT DOCUMENTS

| | | | |
|---|---|---|---|
| JP | 2004-023803 | A | 1/2004 |
| JP | 4461114 | B2 | 5/2010 |
| JP | 2010-148353 | A | 7/2010 |
| JP | 2010-211990 | A | 9/2010 |
| JP | 2011-055592 | A | 3/2011 |
| JP | 2013-027110 | A | 2/2013 |

\* cited by examiner

FIG. 7

| DIFFERENCE IN CHARGE AMOUNT | CHARGE VOLTAGE |
|---|---|
| MORE THAN 800 mAh | 14.0 V |
| 800 mAh TO 300 mAh | 14.4 V |
| 300 mAh TO 250 mAh | 14.6 V |
| 250 mAh TO 0 mAh | 14.8 V |

# ENERGY STORAGE MANAGEMENT DEVICE DECIDING CHARGE VOLTAGE BASED ON DIFFERENCE IN CHARGE AMOUNT OR VOLTAGE DIFFERENCE BETWEEN ENERGY STORAGE DEVICES

CROSS-REFERENCE TO RELATED APPLICATIONS

This application claims the benefit of Japanese patent application No. 2016-071469, filed on Mar. 31, 2016, which is incorporated by reference.

FIELD

A technique disclosed in this specification relates to an energy storage device management device, an energy storage apparatus and an energy storage system.

BACKGROUND

In an assembled battery where a plurality of energy storage devices are connected in series, due to the difference in initial capacity, difference in degree of degradation, or the like, between the energy storage devices, there may be a case where variation (difference in charge amount) is generated between charge amounts of the energy storage devices. When variation occurs in charge amount between the energy storage devices, at the time of charging, there is a possibility that the energy storage device which has a large charge amount becomes an overvoltage. Conventionally, there has been known a technique which suppresses a state where an energy storage device becomes an overvoltage by setting a charge voltage lower than a predetermined voltage (see Japanese Patent No. 4461114).

However, when a charge voltage is set low, a charge amount which can be charged or charge efficiency is lowered. It is also conceivable that a state where an energy storage device becomes an overvoltage can be suppressed by performing an equalization control for reducing a difference in charge amount between the energy storage devices or controlling a charge voltage such that an energy storage device does not become an overvoltage. In this case, however, a device for performing an equalization control or a voltage control is required. In addition, there is an energy storage device having a characteristic that a voltage is suddenly increased near a full charge state. In the energy storage device having such a characteristic, there is also a possibility that an equalization control or a voltage control cannot be performed in time.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the specification, a technique that can suppress a state where a certain energy storage device becomes an overvoltage when there is a difference in charge amount between energy storage devices is disclosed.

There is provided an energy storage device management device which includes a controller configured to decide a charge voltage to be applied to a plurality of energy storage devices connected in series, wherein the controller is configured to perform deciding the charge voltage based on a difference in charge amount or a voltage difference between the energy storage devices.

BRIEF DESCRIPTION OF DRAWINGS

The foregoing and other features of the present invention will become apparent from the following description and drawings of an illustrative embodiment of the invention in which:

FIG. 7 is a view showing voltage decision data.

DESCRIPTION OF EMBODIMENTS

Figure 1:
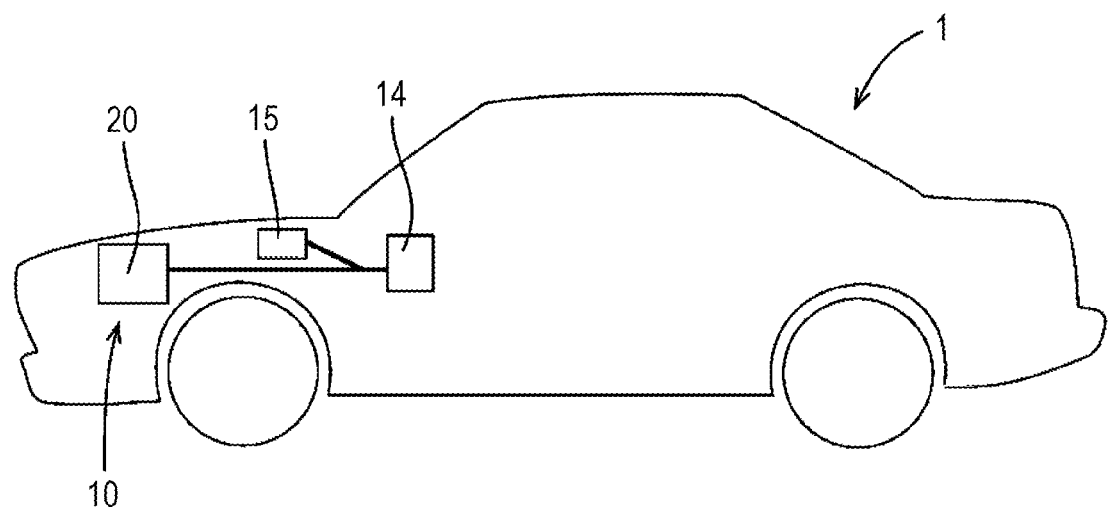
FIG. 1 is a side view of a vehicle to which an energy storage system according to an embodiment is applied.

According to a technique disclosed in this specification, there is provided an energy storage device management device which includes a controller configured to decide a charge voltage to be applied to a plurality of energy storage devices connected in series, wherein the controller is configured to perform deciding the charge voltage based on a difference in charge amount or a voltage difference between the energy storage devices.

With the above configuration, it is possible to suppress a state where a certain energy storage device becomes an overvoltage when there is a difference in charge amount between the energy storage devices.

(Overall Configuration of this Embodiment)

First, the summary of a technique disclosed in this embodiment is described.

An energy storage device management device includes a controller configured to decide a charge voltage to be applied to a plurality of energy storage devices connected in series, wherein the controller is configured to perform deciding the charge voltage based on a difference in charge amount or a voltage difference between the energy storage devices. By deciding the charge voltage based on the difference in charge amount, it is possible to suppress the occurrence of a state that the energy storage device becomes an overvoltage. In an energy storage device, there is a correlation between a charge amount and a voltage. Accordingly, by deciding the charge voltage based on the voltage difference in place of the difference in charge amount, it is also possible to suppress the occurrence of a state that the energy storage device becomes an overvoltage.

The charger voltage may be set such that the larger the difference in charge amount or the voltage difference, the smaller value the charge voltage becomes. The charge voltage is set to a smaller value when the difference in charge amount is large and hence, it is possible to suppress a state where the energy storage device becomes an overvoltage. The charge voltage is set to a larger value when the difference in charge amount (or the voltage difference) is small and hence, a charge amount can be increased.

The energy storage device management device may include a memory part in which voltage decision data is stored where either one of the difference in charge amount or the voltage difference and the charge voltage are made to correspond to each other.

The controller may decide the charge voltage based on either one of the difference in charge amount or the voltage difference and the voltage decision data stored in the memory part. By deciding the charge voltage based on the voltage decision data stored in the memory part, the controller can easily decide the charge voltage compared to a case where processing for obtaining the charge voltage by calculation is performed, for example.

The controller may further perform estimating the difference in charge amount. With such a configuration, the controller can estimate the difference in charge amount based on a state of the energy storage device at a point of time that the charge voltage is decided. Accordingly, the controller can decide the charge voltage based on the more accurate difference in charge amount compared to a case where the controller decides the charge voltage using a difference in charge amount stored in advance, for example.

The energy storage device management device may include an equalization circuit which is configured to perform equalization processing for reducing the difference in charge amount between the energy storage devices, wherein the estimation processing is processing for estimating the difference in charge amount used for the deciding based on an elapsed time from completion of previous-time equalization processing.

During a period from a point of time that equalization processing applied to the energy storage devices is completed to starting of the next-time equalization processing, the difference in charge amount is generated between the energy storage devices due to the difference in self discharge capacity between the energy storage devices. The longer the lapsed time from the completion of the equalization processing, the larger the difference in charge amount which is generated due to the self discharge becomes. Accordingly, the controller can estimate the difference in charge amount based on the elapsed time from the completion of the previous-time equalization processing.

The energy storage device may be an iron-phosphate based lithium ion battery. The iron-phosphate based lithium ion battery has a characteristic that a voltage is suddenly increased near a full charge state and hence, there is a possibility that an equalization control or a control of a charge voltage cannot be performed in time so that the energy storage device becomes an overvoltage. According to the above technique, a charge voltage at which the energy storage device does not become an overvoltage is decided in advance based on a difference in charge amount. Thus, it is possible to prevent the energy storage device from becoming the overvoltage even when the battery is a battery having a characteristic where a voltage is suddenly increased near the completion of charging such as a lithium ion battery.

An energy storage apparatus disclosed in this specification includes: the energy storage device management device described above; and the plurality of energy storage devices.

An energy storage system disclosed in this specification includes: the energy storage apparatus described above; and a charger which charges the plurality of energy storage devices.

The technique disclosed in this specification is applicable to, for example, a decision method for deciding a charge voltage based on a difference in charge amount between energy storage devices, and a computer program for deciding a charge voltage.

An embodiment where the technique disclosed in this specification is applied to an energy storage system 10 is described with reference to FIG. 1 to FIG. 13.

1. Configuration of Energy Storage System 10

As shown in FIG. 1, the energy storage system 10 in this embodiment is mounted on an automobile 1 (vehicle), and includes a battery module 20 (energy storage apparatus) and a vehicle-mounted power generator 15 (charger).

Figure 2:
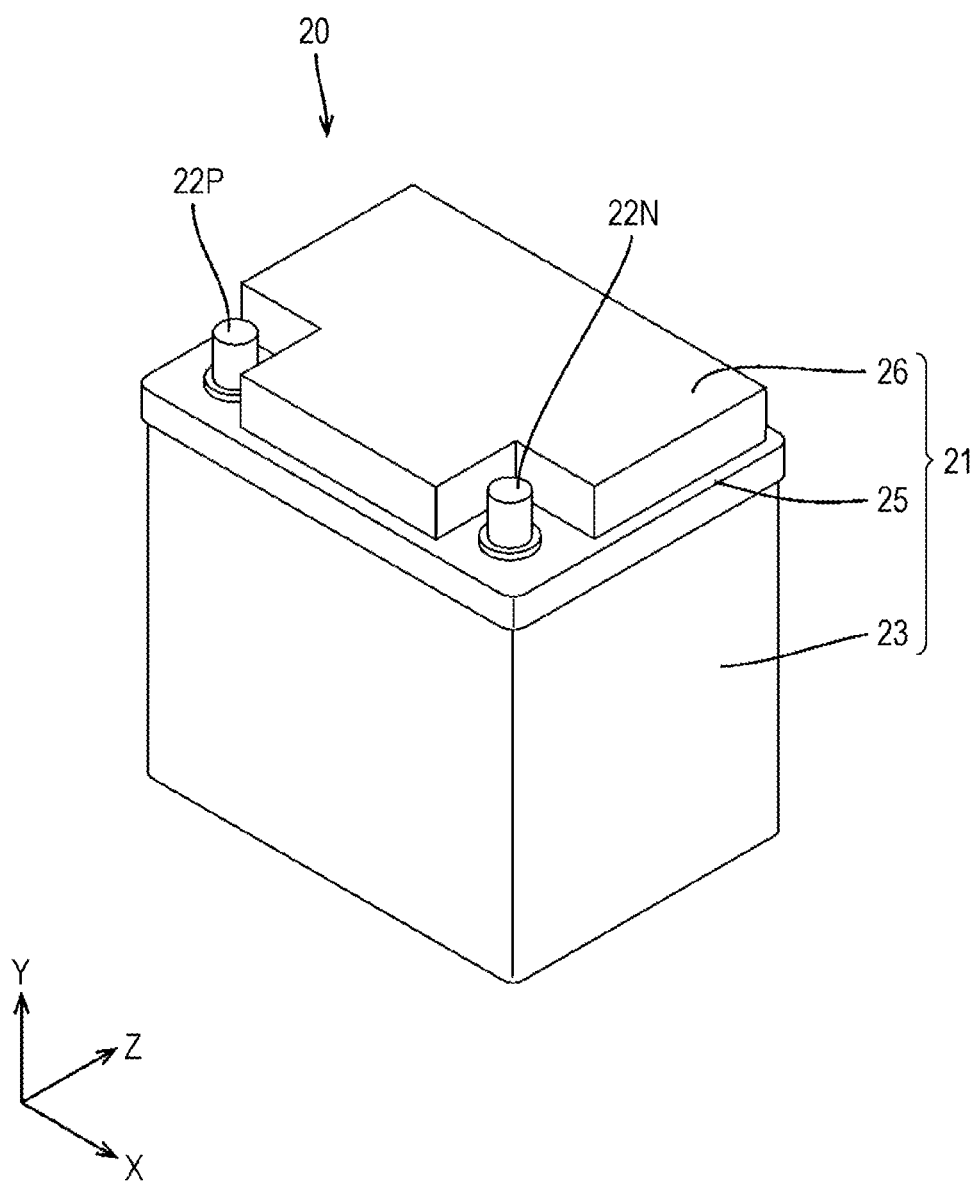
FIG. 2 is a perspective view of a battery module.

The battery module 20 includes a block-like battery case 21 as shown in FIG. 2. In the inside of the battery case 21, an assembled battery 30 formed of a plurality of secondary batteries 31 and a printed circuit board 28 are housed (see FIG. 3). In the description made hereinafter, in the case where FIG. 2 and FIG. 3 are referenced, the description is made by assuming a vertical direction of the battery case 21 when the battery case 21 is placed horizontally without inclination with respect to the mounting surface as "Y direction", a direction which extends along a long side direction of the battery case 21 as "X direction" and a depth direction of the battery case 21 as "Z direction".

Figure 3:
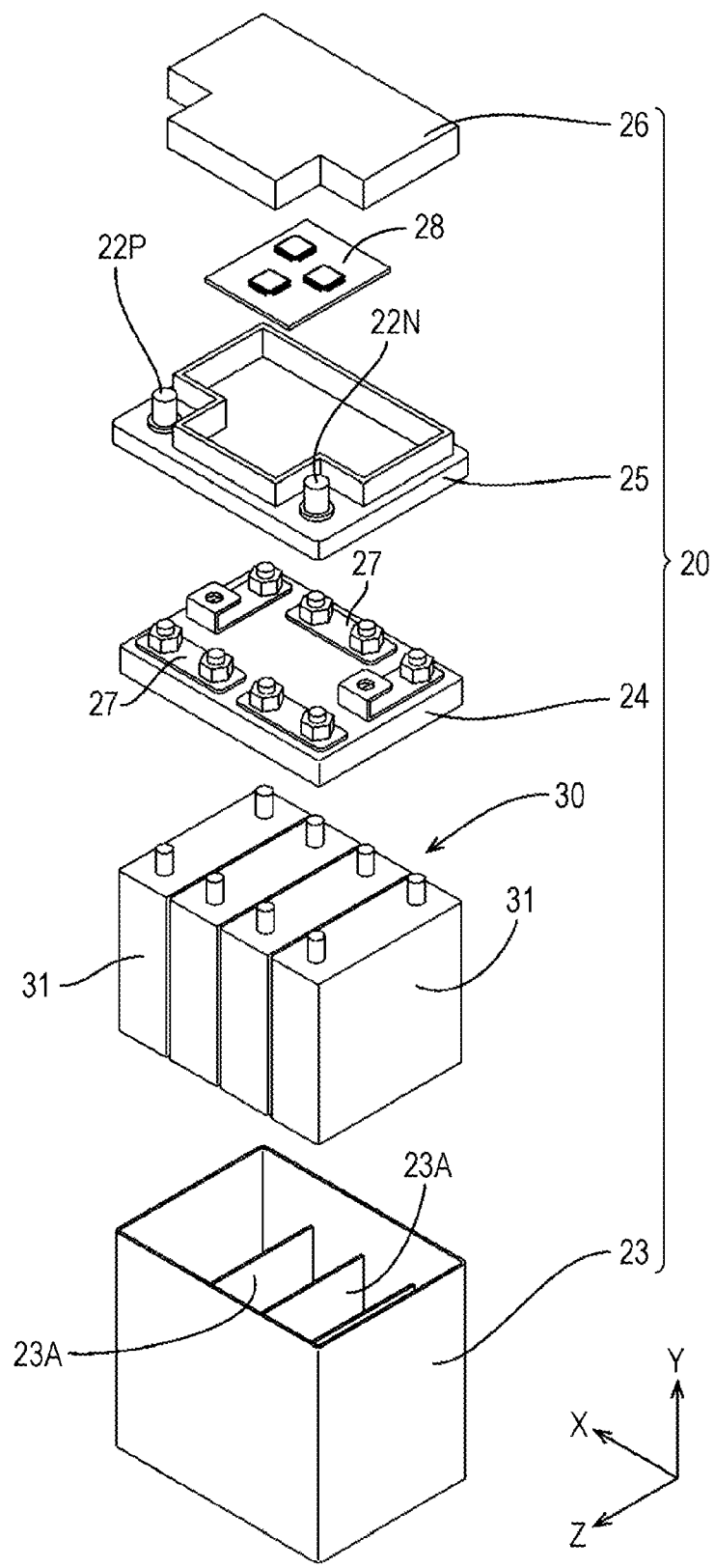
FIG. 3 is an exploded perspective view of the battery module.

As shown in FIG. 3, the battery case 21 includes: a box-like case body 23 which opens upwardly; a positioning member 24 which positions a plurality of secondary batteries 31; an intermediate lid 25 which is mounted on an upper portion of the case body 23; and an upper lid 26 which is mounted on an upper portion of the intermediate lid 25. A plurality of cell chambers 23A in each of which a secondary battery 31 is individually housed are arranged in the case body 23 in a row in the X direction.

As shown in FIG. 3, a plurality of bus bars 27 are disposed on an upper surface of the positioning member 24, and the positioning member 24 is disposed above the plurality of secondary batteries 31 disposed in the inside of the case body 23. With such a configuration, the plurality of secondary batteries 31 are positioned and are connected to each other in series by the plurality of bus bars 27.

As shown in FIG. 3, the intermediate lid 25 has an approximately rectangular shape as viewed in a plan view, and is also formed in a shape where a height difference is made in the Y direction. On both end portions of the intermediate lid 25 in the X direction, a pair of terminal portions 22P, 22N to which harness terminals not shown in the drawing are connected is mounted. The pair of terminal portions 22P, 22N is made of metal such as a lead alloy, for example. The terminal portion 22P forms a positive-electrode terminal portion, and the terminal portion 22N forms a negative-electrode terminal portion.

As shown in FIG. 3, the intermediate lid 25 is configured to house the printed circuit board 28 therein. When the intermediate lid 25 is mounted on the case body 23, the secondary batteries 31 and the printed circuit board 28 are connected to each other.

Figure 4:
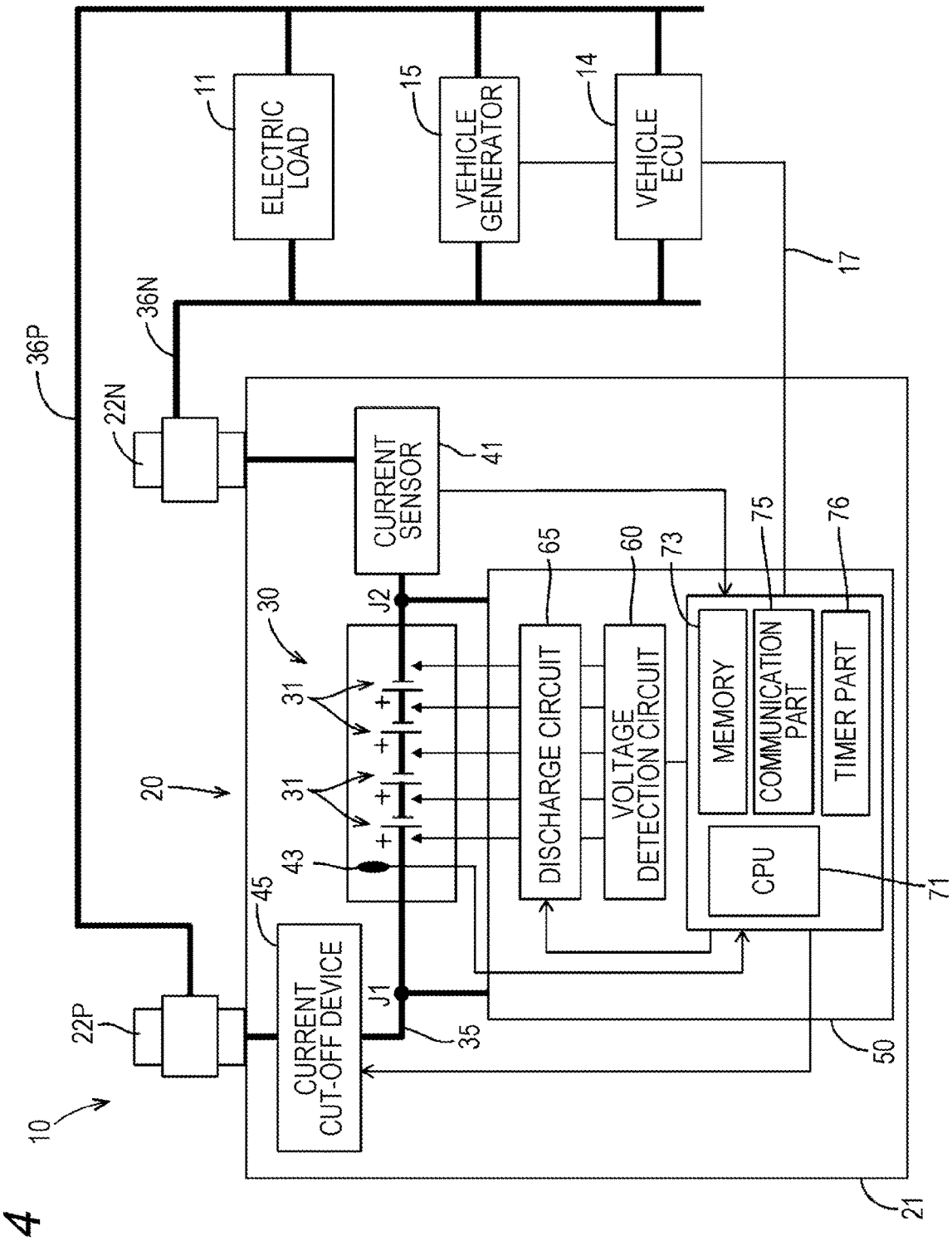
FIG. 4 is a block diagram showing the electrical configuration of the energy storage system.

Next, the electrical configuration of the energy storage system 10 is described with reference to FIG. 4. As shown in FIG. 4, the battery module 20 and the vehicle generator 15 are connected to electric loads 11 and a vehicle ECU 14 mounted on the automobile 1 through a power source line 36P and a ground line 36N. As the electric loads 11, an engine start device such as a starter motor, a headlight, a cabin light, an audio set, a clock, and a security device or the like can be exemplified.

These electric loads 11 are connected with the battery module 20 and the vehicle generator 15 (alternator), and electricity is supplied to the electric loads 11 from the battery module 20 and the vehicle generator 15. That is, when the vehicle generator 15 is not generating electricity such as during parking or during stopping, electricity is supplied to the electric loads 11 from the battery module 20. When the automobile 1 is traveling and an amount of generated electricity exceeds consumed electric power of a load, for example, electricity is supplied to the load from the vehicle generator 15 and the battery module 20 is charged with surplus electricity. On the other hand, when an amount of generated electricity is below the consumed electric power of the load, electricity is supplied to the load not only from the vehicle generator 15 but also from the battery module 20 so as to compensate for a shortage of electricity.

The vehicle ECU 14 (Electronic Control Unit) performs control of respective equipment mounted on the automobile 1. The vehicle generator 15 includes a charge circuit not shown in the drawing. The vehicle ECU 14 performs control of electricity supplied to the battery module 20 from the vehicle generator 15 through a charge circuit.

The battery module 20 includes: the assembled battery 30; a current sensor 41; a thermistor 43; a current cut-off device 45; and a battery management device 50 (hereinafter referred to as BMU 50) which manages the assembled battery 30. The assembled battery 30 is formed of a plurality of secondary batteries 31 (energy storage devices) which are connected in series. The BMU 50 is one example of the energy storage device management device.

The assembled battery 30, the current sensor 41 and the current cut-off device 45 are connected to each other in series through a connecting line 35. In this embodiment, the current sensor 41 is disposed on a negative electrode side, and the current cut-off device 45 is disposed on a positive electrode side. The current sensor 41 is connected to the negative electrode terminal portion 22N, and the current cut-off device 45 is connected to the positive electrode terminal portion 22P.

The current sensor 41 is disposed in the inside of the battery case 21, and performs a function of detecting an electric current which flows in the secondary batteries 31. The thermistor 43 is a contact-type thermistor or a non-contact-type thermistor and performs a function of measuring a temperature [° C.] of the secondary batteries 31.

The current sensor 41 and the thermistor 43 are electrically connected to the BMU 50 by signal lines, and detected values of the current sensor 41 and the thermistor 43 are fetched by the BMU 50. The current sensor 41 is disposed in the inside of the battery case 21.

The current cut-off device 45 is disposed in the inside of the battery case 21. The current cut-off device 45 is, for example, a semiconductor switch such as an FET or a relay.

The current cut-off device 45 performs a function of cutting off an electric current of the secondary battery 31 by opening the power line on a positive electrode side in response to an instruction (control signal) from the BMU 50.

The BMU 50 includes: a voltage detecting circuit 60; a discharge circuit 65; a CPU 71 (controller) which is a central processing unit; a memory 73 (memory part); a communication part 75; and a timer part 76. The printed circuit board 28 described above is mainly formed of the voltage detecting circuit 60, the CPU 71, the memory 73 and the like. As shown in FIG. 4, a power source line of the BMU 50 is connected to a node J1 on a positive electrode side of the assembled battery 30, and a ground line is connected to a node J2 on a negative electrode side of the assembled battery 30. Electricity is supplied to the BMU 50 from the assembled battery 30.

Figure 5:
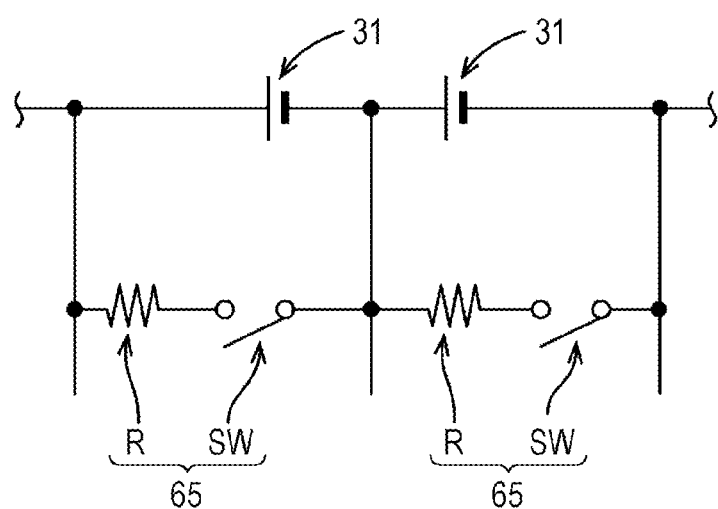
FIG. 5 is a circuit diagram of a discharge circuit.

The voltage detecting circuit 60 is connected to both ends of the respective secondary batteries 31 through detection lines, and measures voltages of the respective secondary batteries 31 and a total voltage of the assembled battery 30 in response to an instruction from the CPU 71. As shown in FIG. 5, the discharge circuit 65 includes a discharge resistance R and a discharge switch SW, and is connected parallel to the secondary batteries 31. The discharge circuit 65 performs processing for reducing difference in charge amount between the secondary batteries 31 (equalization processing) in such a manner that an instruction is given to the discharge circuit 65 from the CPU 71 so that the discharge switch SW is turned on whereby the secondary batteries 31 are individually discharged.

The CPU 71 monitors an electric current, a voltage and a temperature of the secondary batteries 31 based on outputs of the current sensor 41, the voltage detection circuit 60 and the thermistor 43, and operates the current cut-off device 45 when abnormality is detected thus preventing the secondary batteries 31 from being brought into an abnormal state.

The memory 73 is, for example, a non-volatile memory such as a flash memory or an EEPROM. In the memory 73, a program for managing the secondary batteries 31 and data necessary for execution of the program are stored. The memory 73 also stores a program for performing charge amount difference estimation processing (described later) for estimating a difference in charge amount between the secondary batteries 31, a program for performing charge voltage decision processing (described later) for deciding a charge voltage to the secondary batteries 31, and voltage decision data (described later) used for the charge voltage decision processing. The communication part 75 is connected to the vehicle ECU 14 through the communication line 17. With such a configuration, the BMU 50 is communicable with the vehicle ECU 14. The timer part 76 counts a present time.

Figure 6:
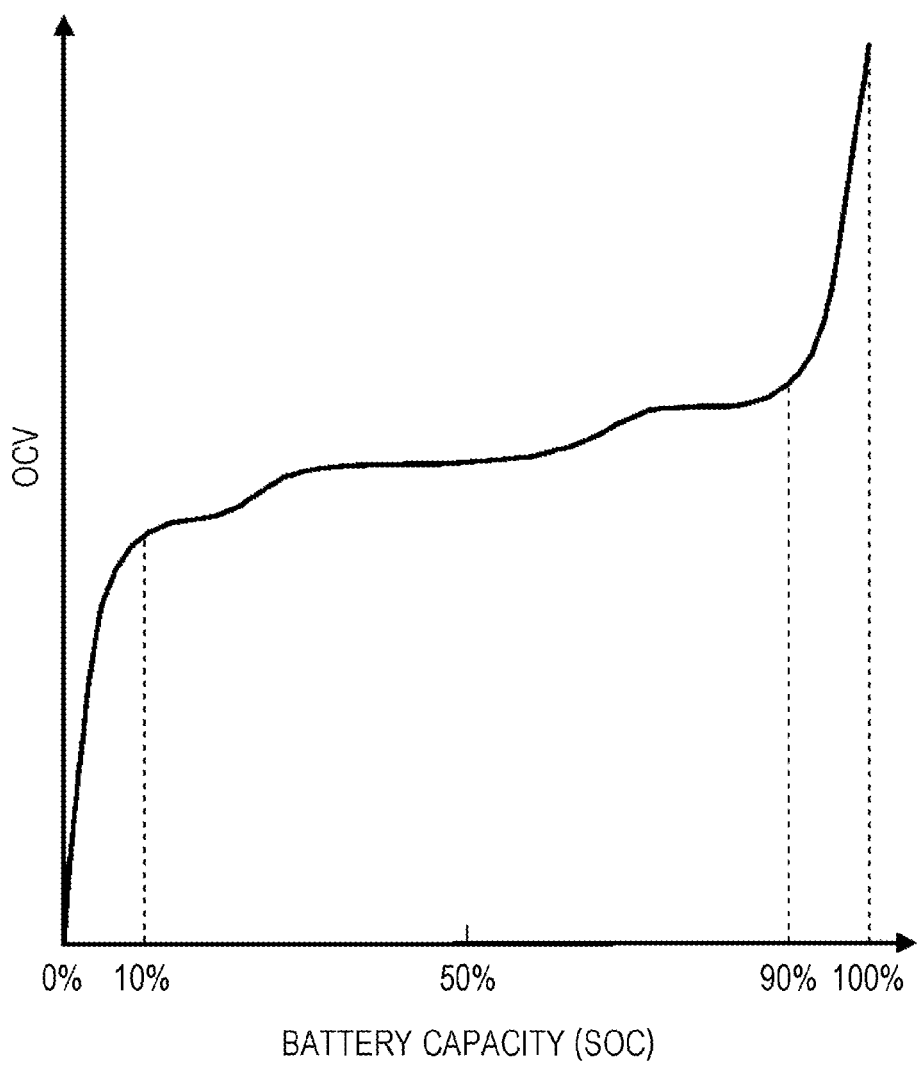
FIG. 6 is a graph showing an SOC-OCV correlation characteristic of a secondary battery.

The secondary battery 31 is, for example, a phosphoric-acid-iron based lithium ion secondary battery which uses phosphoric-acid-iron lithium (LiFePO4) as a positive electrode active material and graphite as a negative electrode active material. FIG. 6 shows an SOC-OCV correlation characteristic of the secondary battery 31. As shown in FIG. 6, the secondary battery 31 has a low change region where a change amount of OCV is relatively low with respect to a change amount of SOC and a high change region where the change amount of OCV is relatively high with respect to the change amount of SOC.

To be more specific, as shown in FIG. 6, the secondary battery 31 has a region (high change region) where an OCV (open circuit voltage) is suddenly increased with respect to an increase of an SOC in a charging initial period (discharging end period) where the SOC is less than 10% and a charging end period where the SOC is more than 90%. The secondary battery 31 also has a region (low change region or plateau region) where an OCV is approximately fixed with respect to an increase of an SOC in a charge middle period (discharge middle period) where the SOC is 10% or more and less than 90%.

Where there is difference in charge amount between secondary batteries 31, there is a possibility that the secondary battery 31, which has a relatively large charge amount, becomes an overvoltage in the charge end period and the secondary battery 31 is degraded. In view of the above, in this embodiment, the CPU 71 performs charge voltage decision processing (decision processing) for deciding a charge voltage to the plurality of secondary batteries 31 based on a difference in charge amount between the secondary batteries 31.

2. Voltage Decision Data

The CPU 71 decides the charge voltage based on a difference in charge amount between the secondary batteries 31 and voltage decision data (see FIG. 7). As shown in FIG. 7, voltage decision data is data where differences in charge amount and charge voltages are made to correspond, respectively, for the plurality of secondary batteries 31, and voltage decision data is stored in the memory 73. Voltage decision data is prepared based on a result obtained by empirically charging electricity to the plurality of secondary batteries 31 (assembled battery 30).

Figure 8:
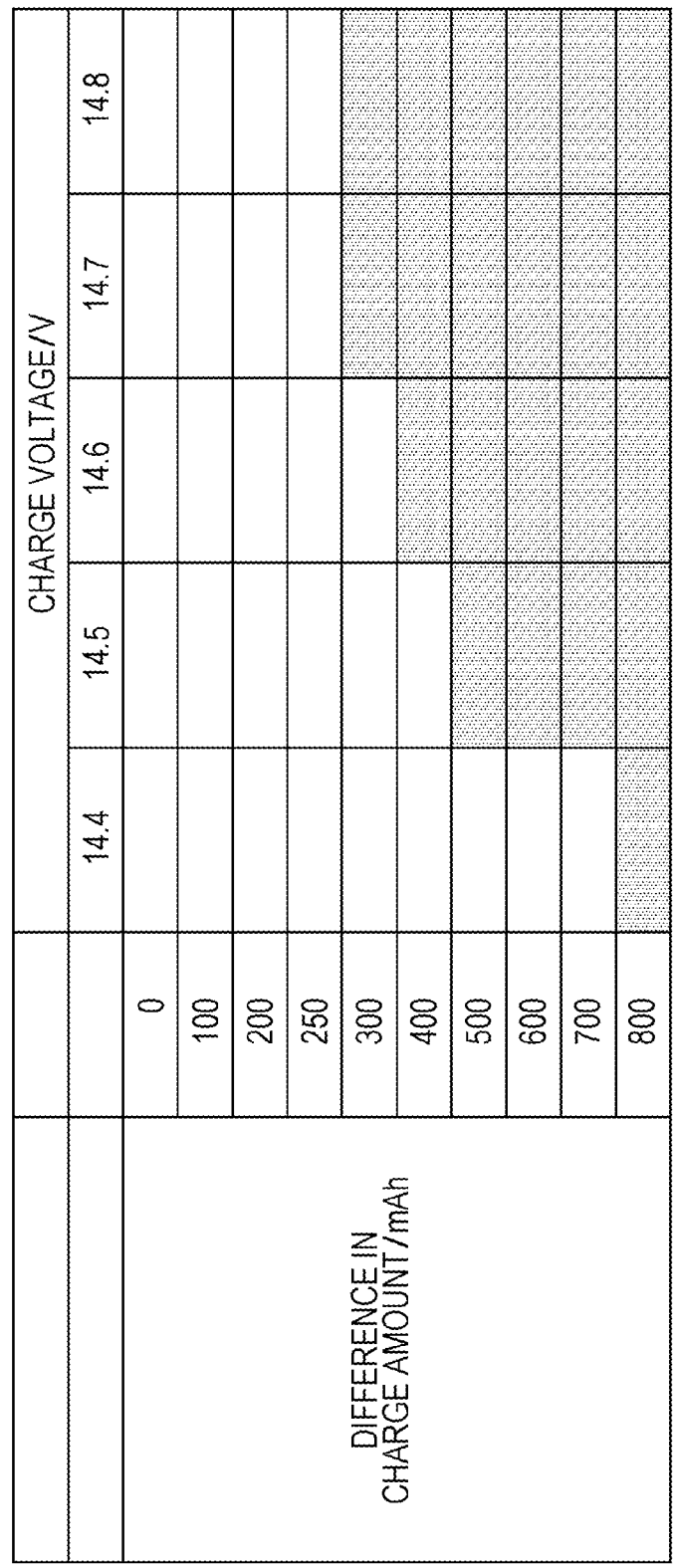
FIG. 8 is a view showing results of tests for preparing voltage decision data.

To prepare voltage decision data, electricity is empirically charged to the assembled battery 30 while changing a difference in charge amount and a charge voltage, and it is checked whether or not respective voltages of the secondary batteries 31 reach a prescribed voltage (for example, 4V). A result of the test is shown in FIG. 8. In the description made hereinafter, a case is exemplified where the assembled battery 30 has four secondary batteries 31 and, among four secondary batteries 31, a charge amount of one secondary battery 31 is relatively high and charge amounts of remaining three secondary batteries 31 are approximately equal to each other and are relatively low. In the case where the charge amounts of four secondary batteries 31 have such a relationship, in a charge end period, a voltage of one secondary battery 31 having a high charge amount becomes high compared to voltages of other three secondary batteries 31 having relatively low charge amounts and becomes an overvoltage. In the description made hereinafter, "difference in charge amount" means a difference in charge amount between the secondary battery 31 having a highest charge amount and the secondary battery 31 having a lowest charge amount among four secondary batteries 31.

In FIG. 8, a meshed column indicates a case where any one of the plurality of secondary batteries 31 reaches the prescribed voltage, and a blank column indicates a case where none of the plurality of secondary batteries 31 reaches the prescribed voltage. In this embodiment, the prescribed voltage is set to 4V, for example, and the determination is made such that a state where the voltage of the secondary battery 31 exceeds 4V is an overvoltage state. However, the prescribed voltage is not limited to 4V and can be suitably changed. In FIG. 8, a result of the case is shown where difference in charge amount is set within a range of 0 to 800 mAh, for example, and a charge voltage is set within a range of 14.4 to 14.8V. However, a numerical range of the difference in charge amount and a numerical range of the charge voltage are not limited to such ranges. The above-mentioned range of the difference in charge amount (0 to 800 mAh) is a value when a rated capacity of the secondary battery 31 is 70 Ah, and corresponds to 0 to 1.14% of the rated capacity. The rated capacity of the secondary battery 31 is not limited to such a value. For example, when rated capacity of the secondary battery 31 is 35 Ah, the range of the difference in charge amount becomes 0 to 400 mAh (which corresponds to 0 to 1.14% of the rated capacity).

Figure 9:
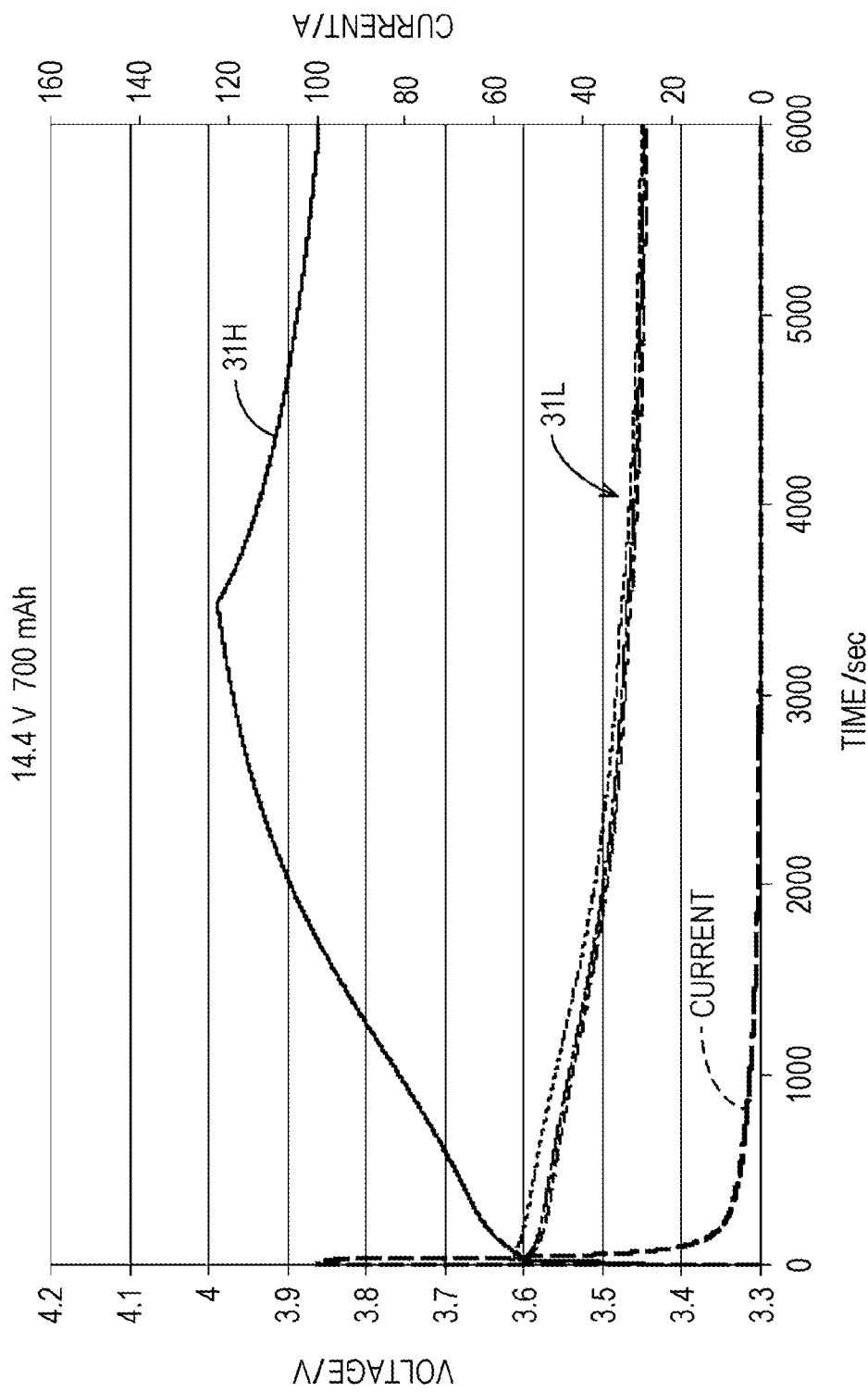
FIG. 9 is a graph showing a result of one test example for preparing voltage decision data.
Figure 10:
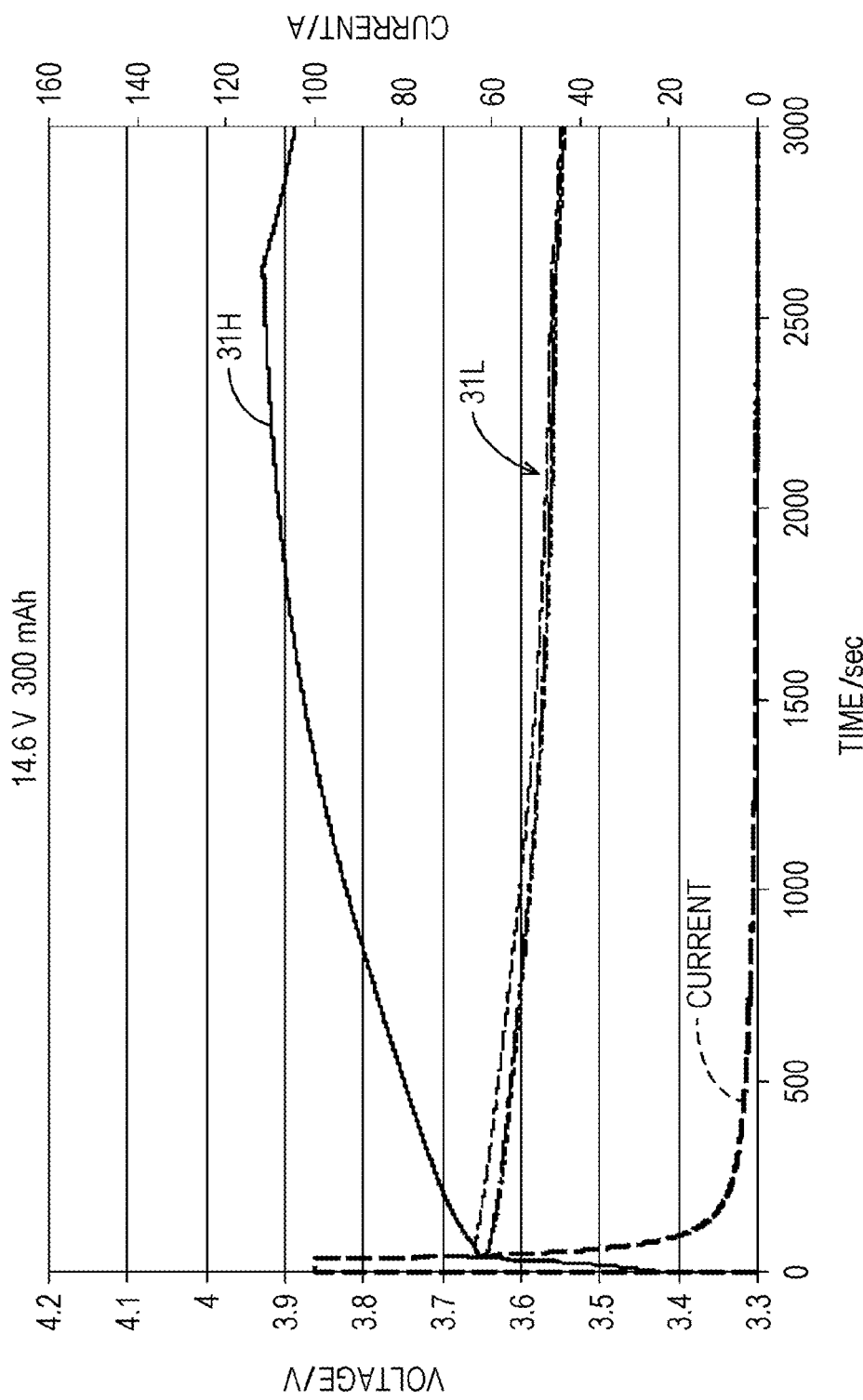
FIG. 10 is a graph showing a result of another test example for preparing voltage decision data.
Figure 11:
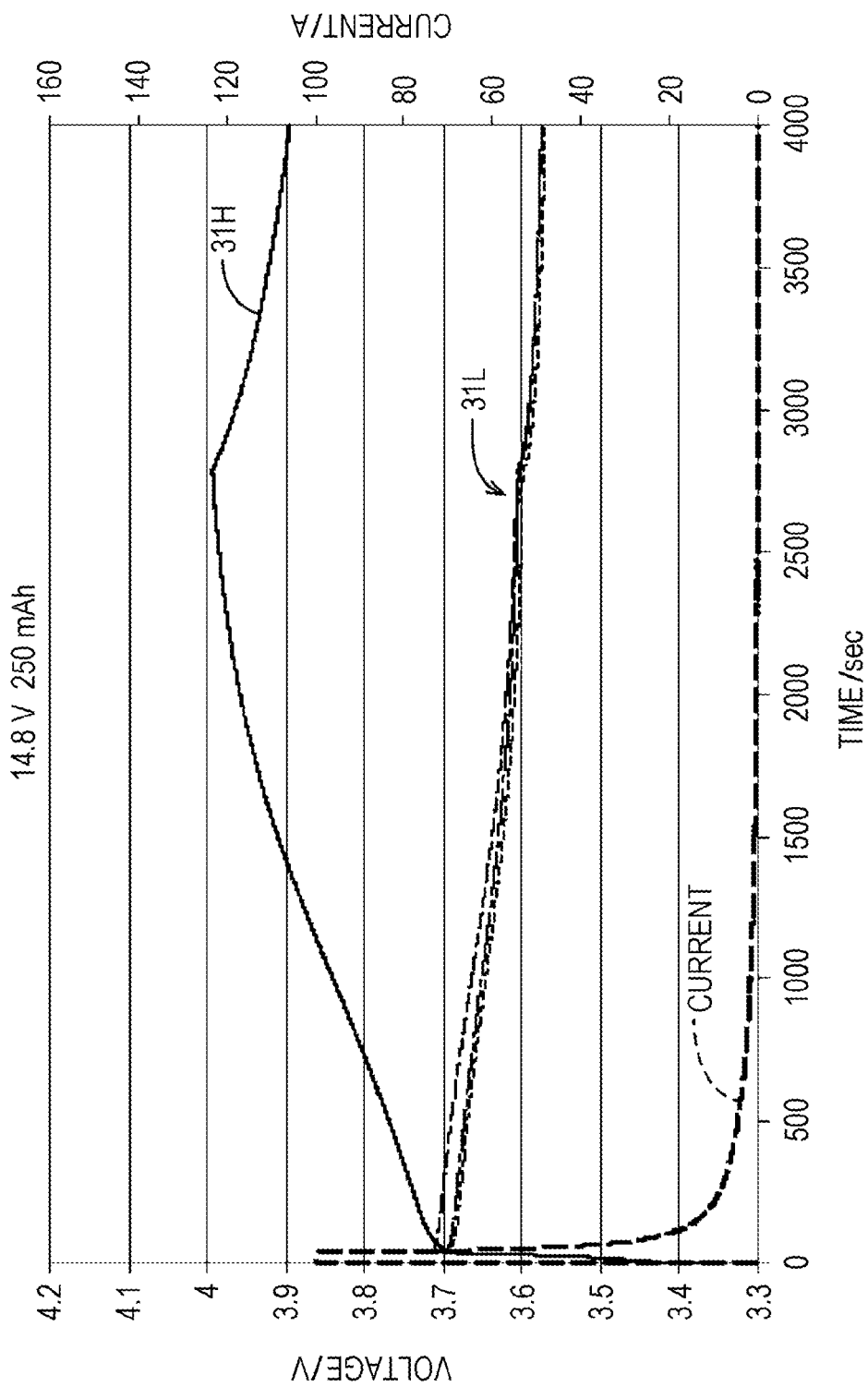
FIG. 11 is a graph showing a result of still another test example for preparing voltage decision data.

Among combinations of difference in charge amount and a charge voltage shown in FIG. 8 (50 kinds in total in FIG. 8), test results relating to three kinds of combinations are respectively described in FIG. 9 to FIG. 11. In this embodiment, in all combinations, voltage decision data is prepared using the test result at the time of performing a constant voltage charge. In the constant voltage charge, after a voltage of the assembled battery 30 reaches a predetermined charge voltage, a charge current droops along with a lapse of time while maintaining the charge voltage. FIG. 9 shows the test result when charging is performed under a condition that difference in charge amount is 700 mAh and the charge voltage is 14.4V. According to FIG. 9, in a process where the charge current droops along with a lapse of time, a voltage (indicated by reference symbol 31H) of one secondary battery 31 having a relatively high charge amount is increased, while voltages (indicated by reference symbol 31L) of other three secondary batteries 31 become slightly smaller. The voltage 31H does not exceed 4V. Thus, the combination of the difference in charge amount and the charge voltage is indicated by a blank column in FIG. 8.

Figure 12:
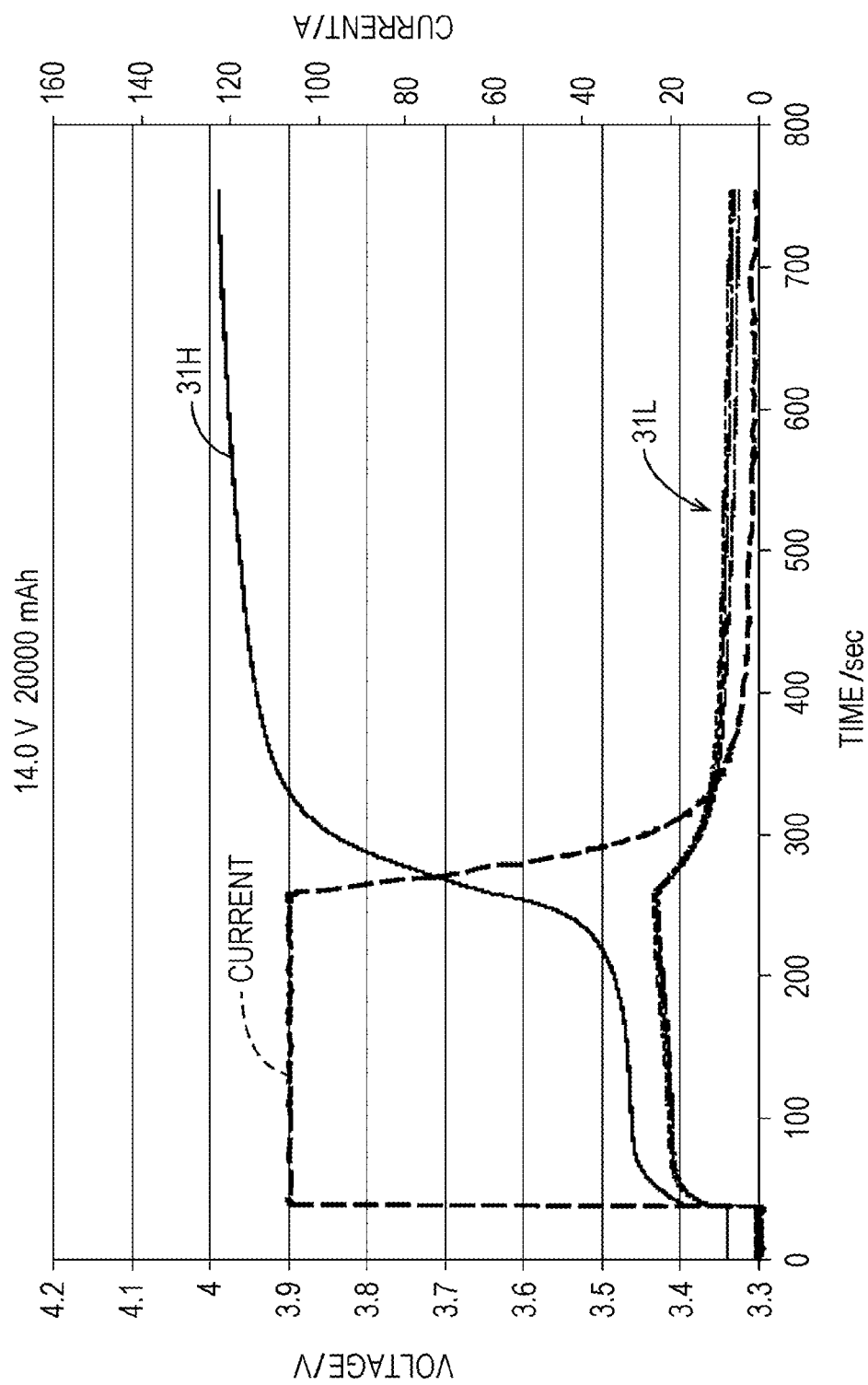
FIG. 12 is a graph showing a result of still another test example for preparing voltage decision data.

FIG. 10 shows the test result when a difference in charge amount is set to 300 mAh and a charge voltage is set to 14.6V, and FIG. 11 shows the test result when a difference in charge amount is set to 250 mAh and a charge voltage is set to 14.8V. According to the test results shown in FIG. 10 and FIG. 11, in both combinations of the difference in charge amount and the charge voltage illustrated in FIG. 10 and FIG. 11, voltages of the secondary batteries 31 do not exceed 4V and hence, all combinations are indicated by a blank column in FIG. 8. In FIG. 10 to FIG. 12, in the same manner as FIG. 9, the voltage of one secondary battery 31 having the relatively high charge amount is indicated by reference symbol 31H, and voltages of three secondary batteries 31 having relatively small charge amounts are indicated by reference symbol 31L.

The voltage decision data shown in FIG. 7 is prepared based on the test result shown in FIG. 8 as follows, for example. As shown in FIG. 8, when a difference in charge amount falls within a range from 0 to 250 mAh, whichever value the charge voltage takes among 14.4V to 14.8V, there is no possibility that the voltages of the secondary batteries 31 exceed 4V and hence, the charge voltage is set to 14.8V which is the highest value as shown in FIG. 7. When a difference in charge amount falls within a range from 250 to 300 mAh, whichever value the charge voltage takes among 14.4V to 14.6V, there is no possibility that the voltages of the secondary batteries 31 exceed 4V and hence, the charge voltage is set to 14.6V. When a difference in charge amount falls within a range from 300 to 800 mAh, there is a case where the voltage of the secondary battery 31 exceeds 4V when the charge voltage becomes 14.5V or more and hence, the charge voltage is set to 14.4V. The charge voltage shown in FIG. 7 is the highest voltage among the charge voltages at which the secondary batteries 31 do not become an overvoltage (do not exceed 4V) at certain difference in charge amount.

FIG. 12 shows a test result of constant voltage charge when a difference in charge amount is set to 20000 mAh and the charge voltage is set to 14.0V. As show in FIG. 12, provided that the charge voltage is 14.0V, even when the difference in charge amount is sufficiently larger than 800 mAh, there is no possibility that the respective voltages of the secondary batteries 31 exceed 4V. Based on this result, when the difference in charge amount is larger than 800 mAh, the charge voltage is set to 14.0V, for example (see FIG. 7). In the voltage decision data according to this embodiment, as shown in FIG. 7, the case is exemplified where the range of the difference in charge amount is divided in four, and the charge voltage is set with respect to the divided ranges. However, the manner of dividing the range of the difference in charge amount is not limited to such a manner, and can be suitably changed.

3. Processing by CPU for Deciding Charge Voltage

Figure 13:
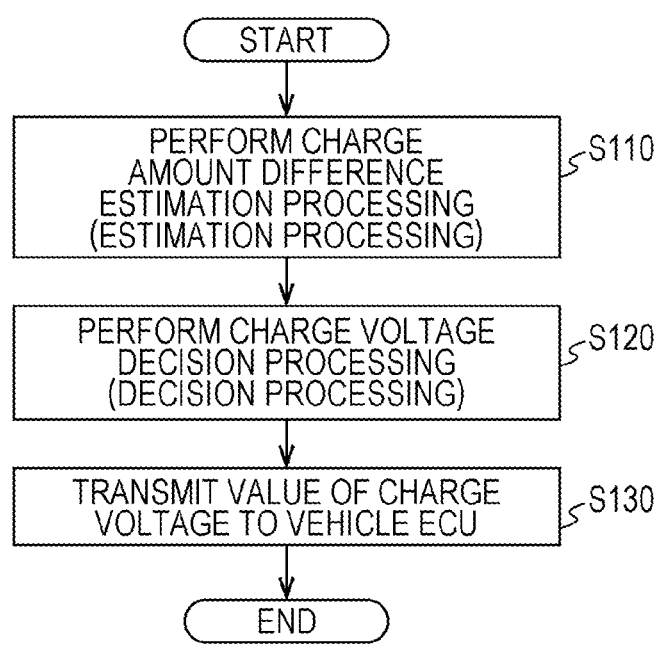
FIG. 13 is a flowchart showing processing of a CPU for deciding a charge voltage.

Next, processing by the CPU 71 for deciding a charge voltage is described. In this embodiment, a difference in charge amount between the secondary batteries 31 is estimated, and a charge voltage is decided based on the estimated difference in charge amount and the voltage decision data described above. Processing by the CPU 71 for deciding the charge voltage is formed of steps S110 to S130 as shown in FIG. 13.

3.1. Charge Amount Difference Estimation Processing (Estimation Processing)

In this embodiment, processing is exemplified where a difference in charge amount between the secondary batteries 31 is estimated based on a time during which the discharge circuit 65 is not operated (non-operating time). In this embodiment, the CPU 71 performs equalization processing where the discharge circuit 65 is operated when a difference in voltage between the secondary batteries 31 becomes a predetermined value or more so that the secondary battery 31 having a relatively large discharge amount (high voltage) is discharged whereby a difference in charge amount between the secondary batteries 31 is reduced. In the plateau region, the difference between voltages of the secondary batteries 31 is small and hence, the discharge circuit 65 is not operated. The discharge circuit 65 is operated near a full charge state where the difference in voltage between the respective secondary batteries 31 is increased.

At a point of time that equalization processing is completed, charge amounts of the plurality of secondary batteries 31 are substantially equal to each other. Thereafter, a state where the discharge circuit 65 is not operated continues and hence, charge amounts of the secondary batteries 31 are reduced by self discharge, respectively. At this point of time, a difference in charge amount is generated due to variation in self discharge capacity (eventually self discharge current) between the respective secondary batteries 31. The longer the period during which the discharge circuit 65 is not operated, the larger a difference in charge amount attributed to self discharge becomes. Accordingly, it is possible to estimate difference in charge amount between the secondary batteries 31 by obtaining a time during which the discharge circuit 65 is not operated (a time during which equalization processing is not performed).

To be more specific, the CPU 71, when the discharge circuit 65 is stopped, acquires a time T1 at which the discharge circuit 65 is stopped from the timer part 76, and stores the time T1 in the memory 73. In performing charge amount difference estimation processing, the CPU 71 calculates time difference DT between a present time T2 and the time T1 at which the discharge circuit 65 is stopped just before the present time T2. That is, a time difference DT is a time during which the discharge circuit 65 is not operated (an elapsed time from the completion of previous-time equalization processing).

Subsequently, the CPU 71 calculates self discharge capacity [mAh] of the respective secondary batteries 31 during the non-operating time (time difference DT) of the discharge circuit 65 by multiplying values of self discharge currents [mA] of the respective secondary batteries 31 stored in the memory 73 by the time difference DT. Next, the CPU 71 estimates a difference in charge amount by calculating the difference between the largest self discharge capacity and the smallest self discharge capacity, for example, among the calculated self discharge capacities of the respective secondary batteries 31 (S110). The CPU 71 may estimate the difference in charge amount by the multiplication of the difference in self discharge current between the secondary batteries 31 and the time difference DT. Values of the self discharge currents of the respective secondary batteries 31 may be values which are measured at the time of manufacturing the secondary batteries 31 and may be stored in the memory 73 in advance, for example.

3.2. Charge Voltage Decision Processing (Decision Processing)

Next, the CPU 71 decides a charge voltage V1 of the assembled battery 30 based on the difference in charge amount between the secondary batteries 31 estimated by the charge amount difference estimation processing and voltage decision data stored in the memory 73 (see FIG. 7) (S120). Based on FIG. 7, for example, when the difference in charge amount is 200 mAh, the charge voltage V1 is decided as 14.8V, and when the difference in charge amount is 500 mAh, the charge voltage V1 is decided as 14.4V. As shown in FIG. 7, when the difference in charge amount falls within a predetermined range (for example, 0 to 800 mAh), the larger the difference in charge amount, the smaller a value of the charge voltage V1 is set. On the other hand, when the difference in charge amount is equal to or more than the predetermined range (for example, 800 mAh or more), a fixed voltage (14.0V in FIG. 7) is decided regardless of the difference in charge amount. In this manner, according to this embodiment, by deciding a charge voltage using voltage decision data shown in FIG. 7, it is possible to decide the highest voltage as the charge voltage V1 among charge voltages where secondary batteries 31 do not become an overvoltage (do not exceed 4V).

Then, the CPU 71 transmits a value of the charge voltage V1 (instruction value) decided in charge voltage decision processing to the vehicle ECU 14 through the communication part 75 (S130). The vehicle ECU 14 performs a control where, for example, a charge circuit (for example, a voltage regulator) mounted in the vehicle generator 15 is operated so that an output voltage of the vehicle generator 15 (a charge voltage applied to the assembled battery 30) becomes the charge voltage V1 transmitted from the BMU 50.

Next, advantageous effects of this embodiment are described. In this embodiment, by deciding a charge voltage based on a difference in charge amount between the secondary batteries 31, it is possible to suppress the occurrence of a state where the secondary battery 31 becomes an overvoltage. To be more specific, the charge voltage is set to a smaller value when the difference in charge amount is large and hence, it is possible to suppress a state where the secondary battery 31 becomes an overvoltage. The charge voltage is set to a larger value when the difference in charge amount is small and hence, a charge amount which can be charged can be increased.

In this embodiment, the energy storage device management device includes the memory 73 in which voltage decision date is stored where a difference in charge amount and a charge voltage are made to correspond to each other.

The CPU 71 decides the charge voltage based on the difference in charge amount and the voltage decision data. By deciding the charge voltage based on the voltage decision data stored in the memory 73, the CPU 71 can easily decide the charge voltage compared to a case where processing for obtaining the charge voltage by calculation is performed, for example.

The CPU 71 performs charge amount difference estimation processing for estimating the difference in charge amount. With such a configuration, the CPU 71 can estimate the difference in charge amount based on a state of the secondary battery 31 at a point of time that the charge voltage is decided. Accordingly, the CPU 71 can decide the charge voltage based on the more accurate difference in charge amount compared to a case where the CPU 71 decides the charge voltage using the difference in charge amount stored in advance, for example.

The battery module 20 includes a discharge circuit 65 which performs equalization processing for reducing the difference in charge amount between the plurality of secondary batteries 31, and the charge amount difference estimation processing is processing where the difference in charge amount is estimated based on an elapsed time from completion of the previous-time equalization processing.

During a period from a point of time that equalization processing applied to the plurality of secondary batteries 31 is completed to starting of the next-time equalization processing (a non-operating time of the discharge circuit 65), the difference in charge amount is generated between the plurality of secondary batteries 31 due to the difference in self discharge capacity between the respective secondary batteries 31. The longer the lapsed time from the completion of the previous-time equalization processing, the larger the difference in charge amount generated by the self discharge becomes. Accordingly, the CPU 71 can estimate the difference in charge amount based on the elapsed time from the completion of the previous-time equalization processing.

The secondary battery 31 is an iron-phosphate based lithium ion battery, for example. The iron-phosphate based lithium ion battery has a characteristic that a voltage is suddenly increased near a full charge state (near completion of charging) and hence, there is a concern that equalization processing by the discharge circuit 65 cannot be performed in time so that the secondary battery 31 becomes an overvoltage. According to this embodiment, a charge voltage which does not become an overvoltage is decided in advance based on a difference in charge amount and hence, it is possible to prevent the overvoltage even when the secondary battery is a battery having a characteristic where a voltage is suddenly increased near the completion of charging such as a lithium ion battery.

Other Embodiments

The technique disclosed in this specification is not limited to the embodiment which has been described with reference to the above-mentioned description and drawings. For example, the following various modes are also included in the disclosed technique.

(1) In the embodiment described above, as one example of the energy storage device, a lithium ion secondary battery which uses phosphoric-acid-iron based positive active material is described. However, the disclosed technique is not limited to such an energy storage device. The energy storage device may be a secondary battery other than a lithium ion secondary battery, and may be a capacitor which accompanies an electrochemical phenomenon or the like. A positive active material of the lithium ion secondary battery is not limited to a phosphoric-acid-iron based positive active material, and can be suitably changed. For example, a ternary-system positive active material may also be used. When the secondary battery 31 having a characteristic (characteristic where a change amount of an OCV with respect to a change amount of an SOC is large) where the OCV is unequivocally determined with respect to the SOC as in the case of a ternary-system positive active material is used, the SOC can be easily estimated from the OCV of each secondary battery 31 compared to the secondary batteries 31 which uses a phosphoric-acid-iron based positive active material. In such a case, an SOC is estimated by measuring an OCV of each secondary battery 31, and a difference in charge amount of the secondary battery 31 may be estimated based on the SOC. A charge voltage may be decided directly from an SOC difference using voltage decision data where the SOC difference and the charge voltage of each secondary battery 31 are made to correspond to each other. A method of estimating an SOC of each secondary battery 31 is not limited to a method where the SOC is obtained based on an OCV (OCV method), and a current integration method or the like may be used, for example.

(2) In the above-mentioned embodiment, the CPU 71 is exemplified as the controller. However, the controller is not limited to the CPU 71. The controller may have the configuration which includes a plurality of CPUs or a hardware circuit such as an ASIC (Application Specific Integrated Circuit). Further, the controller may be an FPGA, an MPU or the combination of these parts. That is, the controller may be any unit which performs the processing exemplified in the above-mentioned embodiment by making use of a software or a hardware circuit.

(3) In the above-mentioned embodiment, the automobile 1 is exemplified as the vehicle on which the battery module 20 is mounted. However, the vehicle is not limited to the automobile 1. In the technique disclosed in this specification, the battery module 20 is applicable to a vehicle other than the automobile such as an electric train. In the above-mentioned embodiment, as a charger, the charger mounted on the vehicle (vehicle generator 15) is exemplified. However, the charger may be disposed outside the vehicle. For example, in the case where the technique disclosed in this specification is applied to the electric train, the charger may be installed in a station or the like. Secondary batteries mounted on an electric train may be charged with electricity supplied from an overhead wire. The battery module 20 is not limited to a battery module mounted on a vehicle, and can be widely used as a power source device for industrial use (emergency power source or the like).

(4) In the above-mentioned embodiment, the configuration is exemplified where the assembled battery 30 includes four secondary batteries 31. However, the disclosed technique is not limited to such a configuration. It is sufficient that the number of secondary batteries 31 be two or more, and the number of secondary batteries 31 can be suitably changed.

Figure 14:
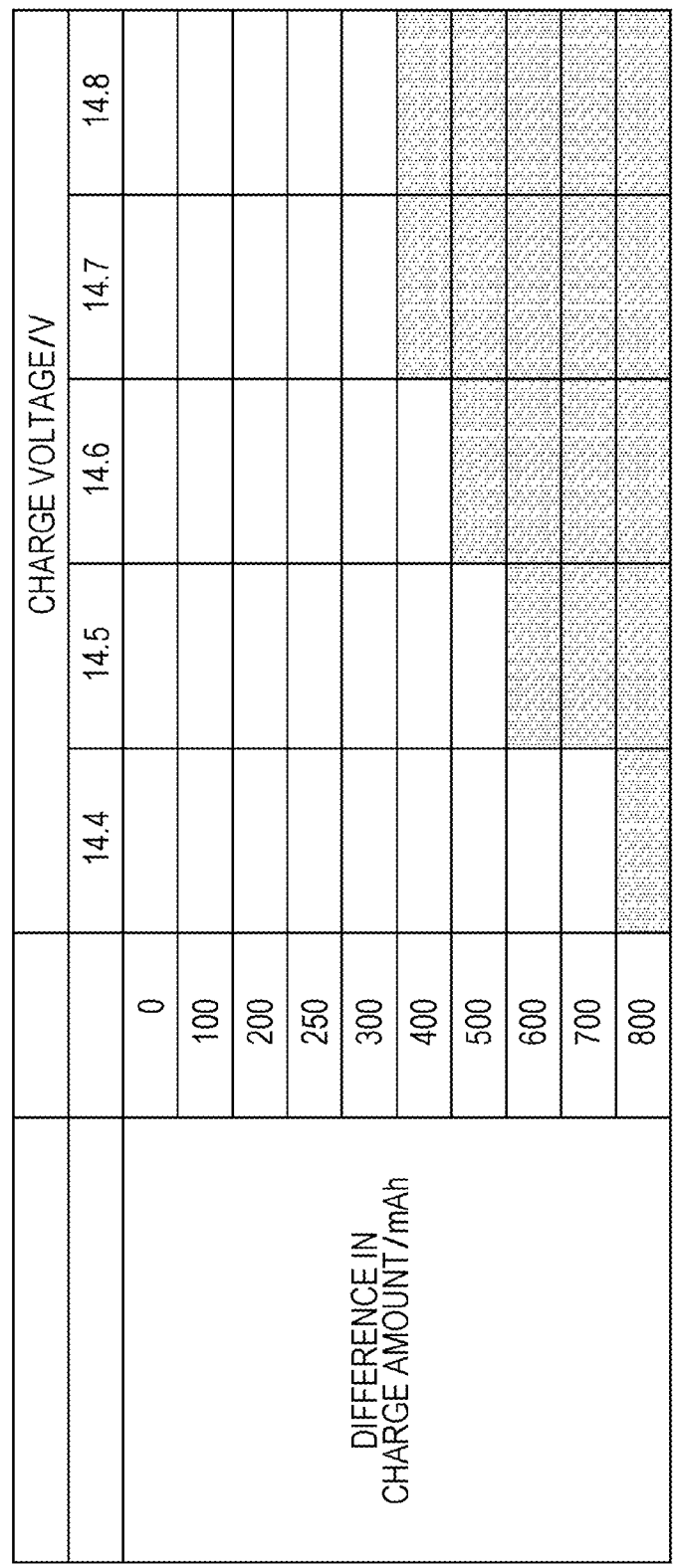
FIG. 14 is a modification 1 of a view showing a result of a test for preparing voltage decision data.
Figure 15:
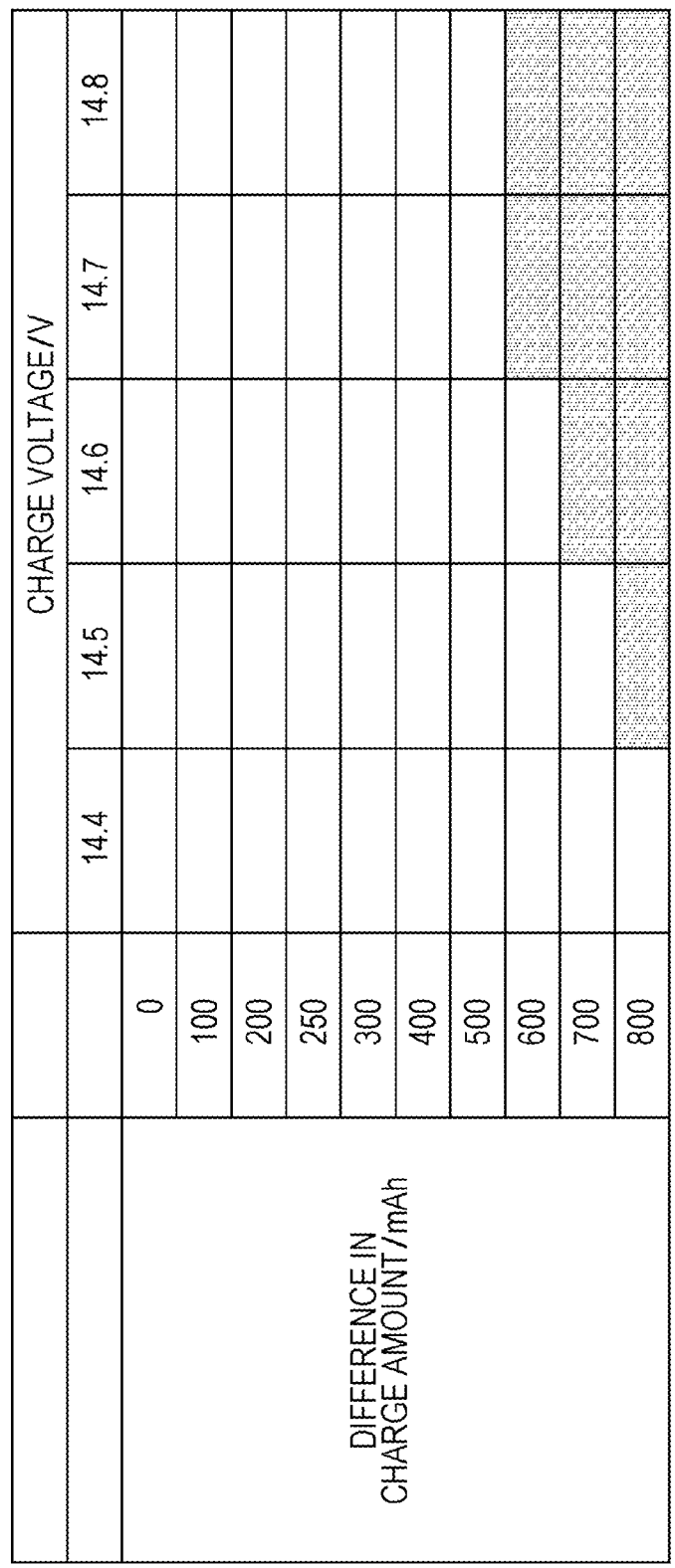
FIG. 15 is a modification 2 of a view showing a result of a test for preparing voltage decision data.

(5) In the above-mentioned embodiment, the case is exemplified where a charge amount of one secondary battery 31 is relatively high and charge amounts of other three secondary batteries 31 are relatively low among four secondary batteries 31. However, the disclosed technique is not limited to such a case. Voltage decision data which corresponds to various patterns may be stored in the memory 73. Such voltage decision data may include, for example, voltage decision data which is prepared based on a test result (see FIG. 14) where charge amounts of two secondary batteries 31 are relatively high and charge amounts of other two secondary batteries 31 are relatively low or voltage decision data which is prepared based on a test result (see FIG. 15) where charge amounts of three secondary batteries 31 are relatively high and a charge amount of one remaining secondary battery 31 is relatively low. With such processing, in the charge voltage decision processing, the CPU 71 can decide a charge voltage by using voltage decision data which corresponds to a pattern of an appropriate difference in charge amount among several kinds of voltage decision data.

Even when all charge amounts of the plurality of secondary batteries 31 differ from each other, the technique disclosed in this specification is applicable. In preparing voltage decision data, it is preferable that voltage decision data be prepared based on a difference in charge amount between the secondary battery 31 having the highest charge amount and the secondary battery 31 having the lowest charge amount. However, the disclosed technique is not limited to such a configuration.

Figure 16:
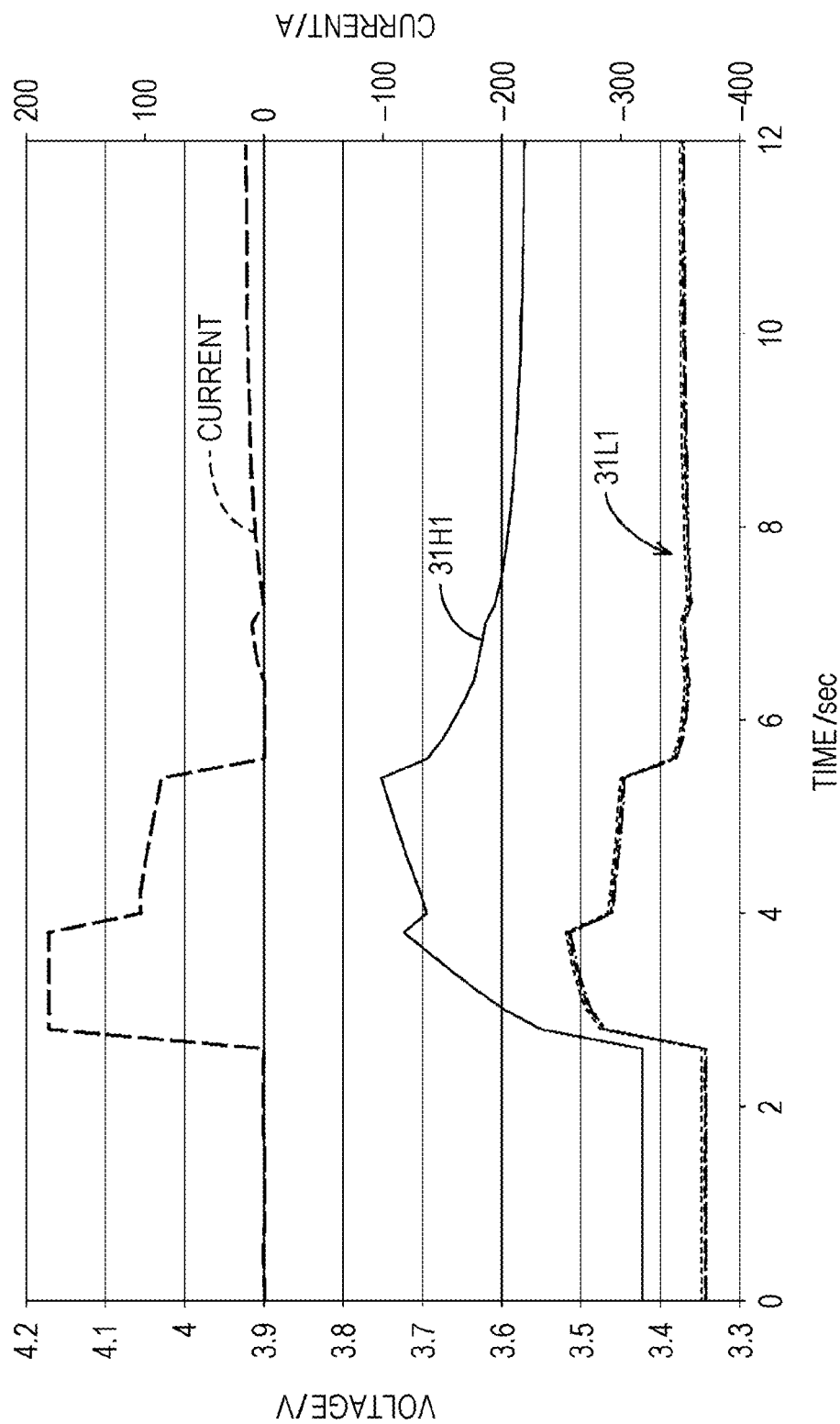
FIG. 16 is a graph showing one example of transition with time of an electric current and voltage of a secondary battery at the time of regenerative charge.

(6) The technique disclosed in this specification is not limited to a constant voltage charge, and is also applicable to a regenerative charge during the deceleration of a vehicle, for example. FIG. 16 shows one example of the transition with time of an electric current and a voltage of the secondary battery 31 during the regenerative charge. As shown in FIG. 16, in the regenerative charge, for example, an electric current is suddenly increased within a short time during a constant current charge so that voltages of the respective secondary batteries 31 are increased respectively. At this point of time, a voltage (indicated by reference symbol 31H1) of the secondary battery 31 having a relatively high charge amount exhibits a large increase amount compared to a voltage (indicated by reference symbol 31L1) of the secondary battery 31 having a low charge amount and hence, there is a concern that a state occurs where the voltage of the secondary battery 31 becomes an overvoltage. When the technique disclosed in this specification is applied to the regenerative charge, charge may be empirically performed in advance in the same situation as the above-mentioned situation at the time of regenerative charge, voltage decision data may be prepared based on the test result, and a charge voltage may be decided using such voltage decision data.

(7) In the above-mentioned embodiment, the configuration is exemplified where charge voltage decision processing is performed on a BMU 50 side, and a control of the charger (vehicle generator 15) is performed on a vehicle ECU 14 side. However, the disclosed technique is not limited to such a configuration. Charge voltage decision processing and a control of the charger may be performed by one controller.

(8) In the above-mentioned embodiment, as equalization processing, the processing is exemplified where the secondary battery 31 having a relatively large charge amount is discharged. However, the disclosed technique is not limited to such processing. For example, a difference in charge amount between the secondary batteries 31 may be decreased by charging the secondary battery 31 having a relatively small charge amount.

(9) In the above-mentioned embodiment, the technique is exemplified where a charge voltage is decided based on a difference in charge amount estimated by charge amount difference estimation processing. However, the disclosed technique is not limited to such a technique. For example, initial capacities of the respective secondary batteries 31 measured at the time of manufacturing the plurality of secondary batteries 31 may be stored in the memory 73, and charge voltage decision processing may be performed using the difference in initial capacity as a difference in charge amount.

(10) In the above-mentioned embodiment, as the charge amount difference estimation processing, the processing is exemplified where the difference in charge amount is estimated using a non-operating time of the discharge circuit 65. However, the disclosed technique is not limited to such processing. As the charge amount difference estimation processing, data indicating a correlation relationship between a voltage and a charge amount may be stored in the memory 73 in advance with respect to the secondary batteries 31, the difference in charge amount may be estimated based on the data and the voltage difference between the respective secondary batteries 31 measured during charging, and a charge voltage may be decided based on the difference in charge amount. A charge voltage may be directly decided based on the voltage difference between the respective secondary batteries 31. To be more specific, in the same manner as the case where a difference in charge amount is used, voltage decision data where the voltage difference between the respective secondary batteries 31 and the charge voltage are made to correspond to each other may be stored in the memory 73, and a charge voltage may be decided based on the voltage decision data and the voltage difference.

(11) In the above-mentioned embodiment, as the charge amount difference estimation processing, the processing is exemplified where the difference in charge amount is estimated using values of self discharge currents of the secondary batteries 31 stored in the memory 73. However, the disclosed technique is not limited to such processing. For example, the difference in self discharge current between the secondary batteries 31 may be calculated based on an operation time of the discharge circuit 65, and the difference in charge amount may be estimated based on the difference in self discharge current. For example, when the discharge circuit 65 is operated only with respect to one secondary battery 31, this secondary battery 31 (hereinafter, indicated by reference symbol 31A) has a high charge amount compared to other secondary batteries 31 (hereinafter, indicated by reference symbol 31B). In other words, it is considered that a value of self discharge capacity (eventually self discharge current) of the secondary battery 31A during the non-operating time (corresponding to the time difference DT in the above-mentioned embodiment) of the discharge circuit 65 is relatively small.

In such a case, the CPU 71 calculates the difference DX in self discharge capacity between the secondary battery 31 and other secondary batteries 31 by integrating a discharge current of the secondary batteries 31A generated by the discharge circuit 65 by an operation time of the discharge circuit 65 (a discharge time of the discharge circuit 65). It is considered that this difference DX is generated by a self discharge during a non-operating time of the discharge circuit 65 just before the operation time. Accordingly, by dividing the difference DX in self discharge capacity by the non-operating time of the discharge circuit 65 just before the operation time, the difference DI in self discharge current between the secondary battery 31A and the other secondary battery 31B can be calculated. By calculating the difference DI in self discharge current and by allowing the memory 73 to store the difference DI in self discharge current, thereafter, it is possible to estimate the difference in charge amount between the secondary battery 31A and the other secondary battery 31B by multiplying the difference DI in self discharge current by the non-operating time of the discharge circuit 65, and an optimum charge voltage can be decided based on the difference in charge amount.

(12) In the above-mentioned embodiment, the case is exemplified where the difference in charge amount is generated due to variation in self discharge current between the respective secondary batteries 31. However, a cause which generates the difference in charge amount is not limited to such a cause. For example, there may be a case where the difference in charge amount is generated due to variation in a consumed current between the respective IC (constitutional parts of the voltage detection circuit 60) for detecting voltages of the respective secondary batteries 31, for example. In such a case, for example, discharge currents of the respective secondary batteries 31 are obtained by adding consumed currents of the corresponding respective ICs to self discharge currents of the respective secondary batteries 31, and the difference in charge amount in the secondary batteries 31 can be obtained by multiplying the difference in the discharge current and a non-operating time of the discharge circuit 65.

(13) In the above-mentioned embodiment, the case is exemplified where the battery module (energy storage device module) is mounted on the automobile, and the battery module is connected to the loads such as the cell motor for starting the engine, a head light, a cabin lamp, an audio set, a clock, and a security device. Alternatively, the present invention may be applied to the management of energy storage devices which are mounted on a two-wheeled vehicle, a rail road vehicle, an uninterruptible power system, a regenerative power receiving device, a natural energy generation energy storage apparatus or the like. A partial or whole function of the energy storage device management device may be arranged in a remote place, and the energy storage device management device may be connected with energy storage devices or an energy storage device module through network connection. The energy storage device management device may be mounted as a server on a network.

What is claimed is:

1. An energy storage device management device, comprising:
    a controller configured to decide a charge voltage to be applied to a plurality of energy storage devices connected in series,
    wherein the decided charge voltage is based on a difference in a charge amount or a voltage difference between the energy storage devices, and
    wherein the controller transmits the decided share voltage to a vehicle electronic control unit (ECU) to cause a vehicle generator to charge the plurality of energy storage devices with the decided charge voltage.

2. The energy storage device management device according to claim 1, wherein the charge voltage is set such that a larger the difference in the charge amount or the voltage difference, a smaller value the charge voltage becomes.

3. The energy storage device management device according to claim 1, further comprising a memory part in which voltage decision data is stored where one of the difference in the charge amount or the voltage difference and the charge voltage are associated.

4. The energy storage device management device according to claim 3, wherein the controller is configured to decide the charge voltage based on either one of the difference in the charge amount or the voltage difference and the voltage decision data stored in the memory part.

5. The energy storage device management device according to claim 3, wherein the voltage decision data is prepared based on a result obtained by empirically charging electricity to the plurality of energy storage devices.

6. The energy storage device management device according to claim 1, wherein the controller is configured to further perform estimating the difference in the charge amount.

7. The energy storage device management device according to claim 6, further comprising an equalization circuit which is configured to perform an equalization processing for reducing the difference in the charge amount between the energy storage devices,
    wherein the estimation processing is processing for estimating the difference in the charge amount used for the deciding based on an elapsed time from completion of a previous-time equalization processing.

8. The energy storage device management device according to claim 1, wherein the energy storage devices comprise an iron-phosphate based lithium ion battery.

9. An energy storage apparatus, comprising:
    the energy storage device management device according to claim 1; and
    the plurality of energy storage devices.

10. An energy storage system, comprising:
    the energy storage apparatus according to claim 9; and
    the vehicle generator configured to charge the plurality of energy storage devices.

11. The energy storage device management device according to claim 1, wherein the controller performs the deciding the charge voltage based on the difference in the charge amount between the energy storage devices.

12. The energy storage device management device according to claim 1, wherein the controller performs the deciding the charge voltage based on the voltage difference between the energy storage devices.

13. The energy storage device management device according to claim 1, wherein a value of the charge voltage is set inversely with the difference in the charge amount.

14. The energy storage device management device according to claim 1, wherein a value of the charge voltage is set inversely with the voltage difference.

15. The energy storage device management device according to claim 1, further comprising a memory part in which voltage decision data is stored where the difference in the charge amount and the charge voltage are associated.

16. The energy storage device management device according to claim 15, wherein the controller decides the charge voltage based on the difference in the charge amount and the voltage decision data stored in the memory part.

17. The energy storage device management device according to claim 15, wherein the voltage decision data is prepared based on a result obtained by empirically charging electricity to the plurality of energy storage devices.

18. The energy storage device management device according to claim 1, further comprising a memory part in which voltage decision data is stored where the voltage difference and the charge voltage are associated.

19. The energy storage device management device according to claim 18, wherein the controller decides the charge voltage based on the voltage difference and the voltage decision data stored in the memory part, and
    wherein the voltage decision data is prepared based on a result obtained by empirically charging electricity to the plurality of energy storage devices.

* * * * *